United States Patent
Kim et al.

(10) Patent No.: US 7,756,087 B2
(45) Date of Patent: Jul. 13, 2010

(54) METHOD AND APPARATUS FOR PERFORMING NON-SCHEDULED TRANSMISSION IN A MOBILE COMMUNICATION SYSTEM FOR SUPPORTING AN ENHANCED UPLINK DATA CHANNEL

(75) Inventors: Young-Bum Kim, Seoul (KR); Sung-Ho Choi, Suwon-si (KR); Soeng-Hun Kim, Suwon-si (KR); Ju-Ho Lee, Suwon-si (KR); Yong-Jun Kwak, Yongin-si (KR); Youn-Hyoung Heo, Suwon-si (KR); Joon-Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 895 days.

(21) Appl. No.: 11/183,252

(22) Filed: Jul. 18, 2005

(65) Prior Publication Data
US 2006/0023629 A1 Feb. 2, 2006

(30) Foreign Application Priority Data

| Jul. 16, 2004 | (KR) | .................. 10-2004-0055678 |
| Aug. 11, 2004 | (KR) | .................. 10-2004-0063331 |
| Jan. 4, 2005 | (KR) | .................. 10-2005-0000627 |
| Mar. 11, 2005 | (KR) | .................. 10-2005-0020752 |

(51) Int. Cl.
*H04B 7/216* (2006.01)
(52) U.S. Cl. .................. 370/335; 370/342; 370/329; 370/341; 370/336
(58) Field of Classification Search ................ None
See application file for complete search history.

(56) References Cited

U.S. PATENT DOCUMENTS 4,736,371 A * 4/1988 Tejima et al. ............... 370/236

(Continued)

FOREIGN PATENT DOCUMENTS

EP 0923202 A2 6/1999

(Continued)

OTHER PUBLICATIONS

"Uplink enhancements for Dedicated Transport Channels" 3GPP TSG RAN1, Nov. 5, 2002, XP002258819, Shangai, China.

*Primary Examiner*—Ajit Patel
(74) *Attorney, Agent, or Firm*—Roylance, Abrams, Berdo & Goodman, L.L.P.

(57) ABSTRACT

A mobile communication system using an enhanced uplink dedicated transport channel transmits data at a relatively low effective data rate through non-scheduled transmission. Data transmission time intervals for user equipments (UEs) have different values in the non-scheduled transmission and therefore uplink interference is reduced. An non-scheduled transmission period N and the number of non-scheduled transmissions k are determined such that each UE performs the non-scheduled transmission. A Node B and each UE are notified of possible non-scheduled transmission time intervals based on the determined non-scheduled transmission period N and the determined number of non-scheduled transmissions k through signaling. The UE transmits the uplink data without the Node B's scheduling at the possible non-scheduled transmission time intervals.

40 Claims, 9 Drawing Sheets

U.S. PATENT DOCUMENTS

| | | | |
|---|---|---|---|
| 5,307,349 A * | 4/1994 | Shloss et al. | 370/442 |
| 5,848,054 A * | 12/1998 | Mosebrook et al. | 370/226 |
| 5,945,948 A | 8/1999 | Buford et al. | |
| 6,385,184 B2 | 5/2002 | Kitade et al. | |
| 6,434,154 B1 * | 8/2002 | Stacey et al. | 370/395.64 |
| 6,970,448 B1 * | 11/2005 | Sparrell et al. | 370/347 |
| 7,177,275 B2 * | 2/2007 | Stanwood et al. | 370/230 |
| 7,327,716 B2 * | 2/2008 | Fong et al. | 370/349 |
| 7,411,971 B2 * | 8/2008 | Freytsis et al. | 370/429 |
| 2004/0024883 A1 | 2/2004 | Hlasny | |
| 2004/0219919 A1 * | 11/2004 | Whinnett et al. | 455/442 |
| 2004/0223507 A1 * | 11/2004 | Kuchibhotla et al. | 370/428 |
| 2004/0233869 A1 * | 11/2004 | Uchida | 370/329 |
| 2005/0047416 A1 | 3/2005 | Heo et al. | |
| 2005/0053088 A1 * | 3/2005 | Cheng et al. | 370/464 |
| 2005/0079865 A1 | 4/2005 | Ahn et al. | |
| 2005/0143083 A1 * | 6/2005 | Kwon et al. | 455/452.1 |
| 2005/0249154 A1 | 11/2005 | Kim et al. | |
| 2006/0128410 A1 * | 6/2006 | Derryberry et al. | 455/509 |
| 2007/0230516 A1 * | 10/2007 | Torsner et al. | 370/538 |
| 2008/0133995 A1 * | 6/2008 | Lohr et al. | 714/748 |

FOREIGN PATENT DOCUMENTS

| | | |
|---|---|---|
| EP | 1067730 A1 | 1/2001 |
| JP | 2001237839 | 8/2001 |
| JP | 2002369261 | 12/2002 |
| JP | 2005039800 | 2/2005 |
| JP | 2006526935 | 11/2006 |
| JP | 2007527631 | 9/2007 |
| KR | 1020050021083 A | 3/2005 |
| KR | 1020050047002 A | 5/2005 |
| KR | 1020050106213 A | 11/2005 |
| KR | 1020050106273 A | 11/2005 |
| RU | 2117396 C1 | 8/1998 |
| RU | 2127363 C1 | 3/1999 |
| RU | 2148889 A | 8/1999 |
| RU | 2258323 | 4/2000 |
| WO | WO 01/63851 | 8/2001 |

* cited by examiner

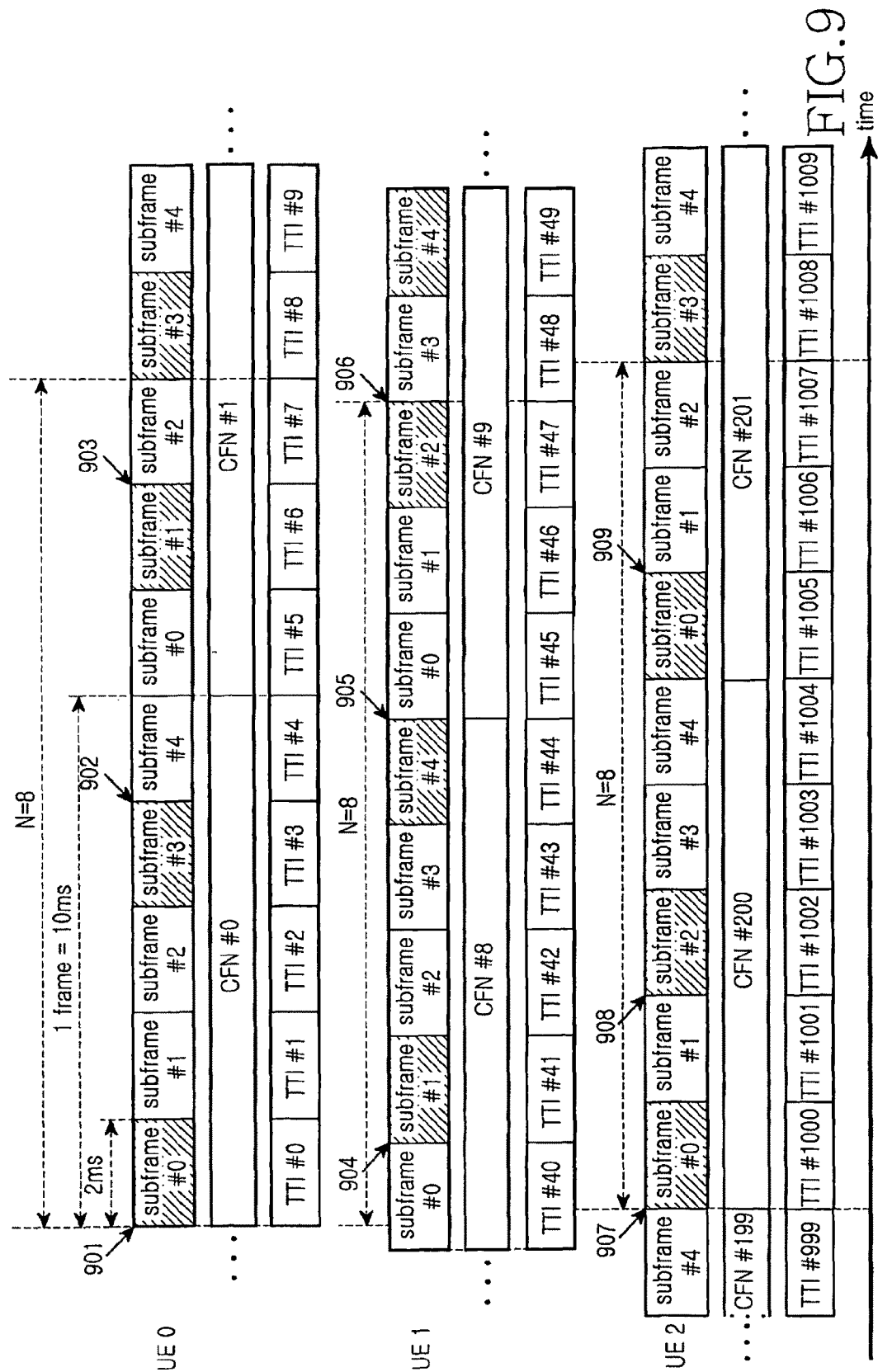

METHOD AND APPARATUS FOR PERFORMING NON-SCHEDULED TRANSMISSION IN A MOBILE COMMUNICATION SYSTEM FOR SUPPORTING AN ENHANCED UPLINK DATA CHANNEL

PRIORITY

This application claims the benefit under 35 U.S.C. §119(a) of an application entitled "Method and Apparatus for Performing Non-scheduled Transmission in a Mobile Communication System for Supporting an Enhanced Uplink Dedicated Channel" filed in the Korean Intellectual Property Office on Jul. 16, 2004 and assigned Serial No. 2004-55678, an application entitled "Method and Apparatus for Performing Non-scheduled Transmission in a Mobile Communication System for Supporting an Enhanced Uplink Dedicated Channel" filed in the Korean Intellectual Property Office on Aug. 11, 2004, and assigned Serial No. 2004-63331, an application entitled "Method and Apparatus for Performing Non-scheduled Transmission in a Mobile Communication System for Supporting an Enhanced Uplink Dedicated Channel" filed in the Korean Intellectual Property Office on Jan. 4, 2005, and assigned Serial No. 2005-627, and an application entitled "Method and Apparatus for Performing Non-scheduled Transmission in a Mobile Communication System for Supporting an Enhanced Uplink Dedicated Channel" filed in the Korean Intellectual Property Office on Mar. 11, 2005, and assigned Serial No. 2005-20752, the entire contents of each are incorporated herein by reference.

BACKGROUND OF THE INVENTION

1. Field of the Invention

The present invention generally relates to a cellular code division multiple access (CDMA) communication system. More particularly, the present invention relates to an non-scheduled transmission method and apparatus for transmitting non-scheduled data through an enhanced uplink dedicated transport channel.

2. Description of the Related Art

A universal mobile telecommunication service (UMTS) system serving as the third generation mobile communication system uses wideband code division multiple access (CDMA) based on a global system for mobile communications (GSM) serving as a European mobile communication system and general packet radio services (GPRS). The UMTS system performs packet-based transmission of text, digitized voice, video, and multimedia at data rates up to 2 megabits per second (Mbps) that offers a consistent set of services to mobile phone or computer users no matter where they are located in the world.

In uplink (UL) communication from a user equipment (UE) to a base station (BS) or Node B, the UMTS system uses a transport channel such as an enhanced uplink dedicated channel (EUDCH or E-DCH) to improve the performance of packet transmission. The E-DCH supports technologies such as adaptive modulation and coding (AMC), a hybrid automatic retransmission request (HARQ), Node B controlled scheduling, a shorter transmission time interval (TTI), and so on to support stable high-speed data transmissions.

The AMC determines modulation and coding schemes of a data channel according to channel status between a Node B and a UE, and improves the efficiency of the resources being used. A combination of the modulation and coding schemes is referred to as a modulation and coding scheme (MCS). Various MCS levels can be defined by supportable modulation and coding schemes. The AMC adaptively determines an MCS level according to channel status between a Node B and a UE, and improves the efficiency of the resources being used.

The HARQ is a scheme for retransmitting a packet to compensate for an erroneous packet when an error occurs in an initially transmitted data packet. The HARQ scheme is divided into a chase combining (CC) scheme for retransmitting a packet with the same format as that of the initially transmitted data packet when an error occurs, and an incremental redundancy (IR) scheme for retransmitting a packet with a format different from that of the initially transmitted data packet when an error occurs.

According to the Node B controlled scheduling, the Node B determines a data rate for an uplink data transmission through an E-DCH and an upper limit of an available data rate, and sends the determined data rate information to a UE. The UE refers to the data rate information, and determines a data rate of the E-DCH to send data.

A shorter TTI is less than the minimum TTI of 10 ms for the conventional DCH, such that a retransmission delay time is reduced and hence high system throughput can be achieved.

FIG. 1 illustrates uplink packet transmissions through E-DCHs in a conventional wireless communication system. In FIG. 1, reference numeral 100 denotes a Node B for supporting E-DCHs, and reference numerals 101, 102, 103, and 104 denote UEs using the E-DCHs. The UEs 101 to 104 transmit data to the Node B 100 through E-DCHs 111, 112, 113, and 114, respectively.

Using data buffer status, requested data rate, or channel status information of the UEs 101 to 104, the Node B 100 provides each UE with information indicating if E-DCH data transmission is possible, or data rate information for controlling an EUDCH data rate. To improve the overall performance of the system, a scheduling operation assigns relatively low data rates to the UEs 103 and 104 far away from the Node B 100 such that a noise rise or rise over thermal (RoT) value measured by the Node B 100 does not exceed a target value. However, the scheduling operation assigns relatively high data rates to the UEs 101 and 102 close to the Node B 100.

FIG. 2 is a message flow diagram illustrating a transmission and reception process through a conventional E-DCH.

Referring to FIG. 2, the E-DCH is established between a Node B and a UE in step 202. This E-DCH setup process comprises a process for transmitting and receiving messages through a dedicated transport channel. In step 204, the UE notifies the Node B of scheduling information. The scheduling information preferably comprises UE transmission power information about an uplink channel status, information about a remaining amount of UE transmission power, information about an amount of data, stored in a buffer, to be transmitted from the UE, and so on.

In step 206, the Node B schedules data transmissions of a plurality of UEs, and monitors the scheduling information of the UEs. In step 208, the Node B makes a determination for allowing the UE to perform uplink packet transmission using scheduling information received from the UE, and sends scheduling assignment information to the UE. The scheduling assignment information comprises information about an allowed data rate and allowed transmission timing, and so on.

In step 210, the UE determines a transport format (TF) of an E-DCH to be transmitted in the uplink direction using the scheduling assignment information. The UE sends information regarding the determined TF to the Node B in step 212, and transmits UL packet data using the E-DCH according to the determined TF in step 214. The TF information preferably comprises a transport format resource indicator (TFRI) indicating resource information necessary to demodulate the E-DCH. In step 214, the UE selects an MCS level while considering a data rate assigned by the Node B and a channel status, and transmits the uplink packet data using the MCS level.

In step 216, the Node B determines if an error is present in the TF information and the packet data. In step 218, the Node B sends negative acknowledge (NACK) information to the UE through an NACK channel if an error is present, or sends acknowledge (ACK) information to the UE through an ACK channel if no error is present. When the ACK information is sent, the packet data transmission is completed and the UE transmits new user data through an E-DCH. However, when the NACK information is sent, the UE retransmits the same packet data through the E-DCH.

The Node B assigns a low data rate to a UE far away from the Node B, a UE in a bad channel status, or a UE for providing a low priority data service, and assigns a high data rate to a UE close to the Node B, a UE in a good channel status, or a UE for providing a high priority data service, thereby improving the performance of the overall system.

The UE enables non-scheduled transmission (referred to as non-scheduled transmission) for transmitting uplink data through the E-DCH without using scheduling assignment information. The non-scheduled transmission can quickly transmit E-DCH data by omitting a series of processes for sending scheduling information from the UE to the Node B and receiving scheduling assignment information from the Node B. The system limits a data rate possible for the non-scheduled transmission to within a relative low level, thereby maintaining system performance enhancement through the Node B controlled scheduling and reducing a delay time due to scheduling.

FIG. 3 illustrates transport format combinations (TFCs) available for an E-DCH to be transmitted through the uplink to control a data rate of a UE in ascending order of E-DCH data rates or power levels.

Reference numeral 301 denotes a TFC set (TFCS) configured by a radio network controller (RNC) or a set of all TFCs available in the UE. Reference numeral 302 denotes TFCs (referred to as a TFC subset) controlled by the Node B within the TFCS 301 configured by the RNC. The UE selects a suitable TFC from the TFC subset 302 while taking into account an amount of data remaining in a buffer, necessary spare power, and so on. A minimum TFC set 303 can be a set of the TFCs possible for non-scheduled transmission. That is, the UE can use TFCs of the minimum TFC set 303 without the Node B's scheduling. The TFC subset 302 is equal to the TFCS 301 or is included in the TFCS 301. Alternatively, the TFC subset 302 is equal to the minimum TFC set 303 or includes the minimum TFC set 303.

Conventionally, because a data rate and a transmission power level have a one-to-one correspondence relation, uplink interference increases as the E-DCH data rate increases. Accordingly, when the E-DCH data rate used for the non-scheduled transmission increases, high uplink interference occurs, resulting in the degradation of system performance. An E-DCH data rate available in the non-scheduled transmission needs to be controlled to within a relatively low value such that the uplink interference due to the non-scheduled transmission is controlled.

In addition to the Node B controlled scheduling, additional signaling is required to control an E-DCH data rate available in the non-scheduled transmission. Conventionally, an allowable signaling overhead ratio is within about 10% when data is transmitted. When 16 header bits of the conventional radio link control (RLC) protocol data unit (PDU) and 16 cyclic redundancy check (CRC) bits are overhead bits, a possible data size is 320 bits, with an overhead of 32 bits, where the overhead ratio is 10%. When a data rate associated with an E-DCH TTI is computed, a data rate is 32 kbps (with an overhead of 320 bits/10 ms) in case of a TTI of 10 ms, and a data rate is 160 kbps (with an overhead of 320 bits/2 ms) in case of a TTI of 2 ms. In case of an E-DCH with the 2-ms TTI, a relatively high data rate is required and high uplink interference occurs. In this case, system coverage may be lower.

Accordingly, a need exists for technology for effectively transmitting non-scheduled transmission parameters for an E-DCH in a state in which the signaling overhead does not exceed a predetermined level during a data transmission interval in the conventional communication system as well as the UMTS system.

SUMMARY OF THE INVENTION

It is, therefore, an aspect of the present invention to provide a method and apparatus for performing efficient non-scheduled transmission in a mobile communication system using an enhanced uplink dedicated transport channel.

It is another aspect of the present invention to provide a method and apparatus that can reduce uplink interference due to non-scheduled transmission through an enhanced uplink dedicated transport channel.

It is another aspect of the present invention to provide a method and apparatus that can reduce an effective data rate in non-scheduled transmission through an enhanced uplink dedicated transport channel.

It is yet another aspect of the present invention to provide a method and apparatus that can minimize additional signaling in non-scheduled transmission through an enhanced uplink dedicated transport channel.

The above and other aspects of the present invention can be achieved by a method for performing non-scheduled transmission in a user equipment (UE) of a mobile communication system for supporting an enhanced uplink dedicated channel (E-DCH), comprising the steps of receiving non-scheduled transmission information indicating k transmission time intervals (TTIs), wherein non-scheduled transmissions can be performed during the k TTIs within a period; and transmitting data on at least one TTI of the k TTIs within the period, wherein the parameter k is an integer greater than 0 and less than or equal to a positive integer N.

The above and other aspects of the present invention can be achieved by an apparatus for performing non-scheduled transmission in a user equipment (UE) of a mobile communication system for supporting an enhanced uplink dedicated channel (E-DCH), comprising a receiver receiving non-scheduled transmission information indicating k transmission time intervals (TTIs), wherein non-scheduled transmissions can be performed during the k TTIs within a period; and a transmitter transmitting data on at least one TTI of the k TTIs within the period, wherein the k is an integer greater than 0 and less than or equal to a positive integer N.

The above and other aspects of the present invention can be achieved by a method for controlling non-scheduled transmission of a user equipment (UE) in a radio network controller (RNC) of a mobile communication system for supporting an enhanced uplink dedicated channel (E-DCH), comprising the steps of setting k transmission time intervals (TTIs); and transmitting, to the UE, non-scheduled transmission information indicating the k TTIs within the period, wherein the non-scheduled transmissions can be performed during the k TTIs within a period, and the parameter k is an integer greater than 0 and less than or equal to a positive integer N.

The above and other aspects of the present invention can be achieved by an apparatus for controlling non-scheduled transmission of a user equipment (UE) in a radio network controller (RNC) of a mobile communication system for supporting an enhanced uplink dedicated channel (E-DCH), comprising a controller setting k transmission time intervals (TTIs); and a transmitter transmitting, to the UE, non-scheduled transmission information indicating the k TTIs within the period, wherein the non-scheduled transmissions can be performed during the k TTIs within a period, and the parameter k is an integer greater than 0 and less than or equal to a positive integer N.

The above and other aspects of the present invention can be achieved by a method for transmitting uplink data in a mobile communication system for supporting an enhanced uplink dedicated channel (E-DCH), comprising the steps of transmitting scheduling information about at least one of a buffer status indicating an amount of data to be transmitted and uplink transmission power to a Node B; receiving at least one of scheduling assignment information generated by the Node B based on the scheduling information and non-scheduled transmission information indicating k transmission time intervals (TTIs) within a period; transmitting uplink data according to the scheduling assignment information in a Node B controlled scheduling mode; and transmitting uplink data on at least one TTI of the k TTIs within the period in a non-scheduled transmission mode, wherein the parameter k are integer greater than 0, and less than or equal to a positive integer N.

The above and other aspects of the present invention can be achieved by an apparatus for transmitting uplink data in user equipment (UE) of a mobile communication system for supporting an enhanced uplink dedicated channel (E-DCH), comprising a receiver receiving at least one of scheduling assignment information generated by the Node B based on a scheduling information and non-scheduled transmission information indicating k transmission time intervals (TTIs) within a period; a controller selecting a Node B controlled scheduling mode or an non-scheduled transmission mode to transmit data; and a transmitter transmitting uplink data according to the scheduling assignment information in the Node B controlled scheduling mode, and transmitting uplink data on at least one TTI of the k TTIs within the period in the non-scheduled transmission mode, wherein the parameter k are integer greater than 0, and less than or equal to a positive integer N.

BRIEF DESCRIPTION OF THE DRAWINGS

The above and other aspects and advantages of the present invention will be more clearly understood from the following detailed description taken in conjunction with the accompanying drawings, in which:

FIG. 9 is a timing diagram illustrating non-scheduled transmission time intervals for UEs when an E-DCH TTI is 2 ms in accordance with another preferred embodiment of the present invention.

DETAILED DESCRIPTION OF EXEMPLARY EMBODIMENTS

Figure 1:
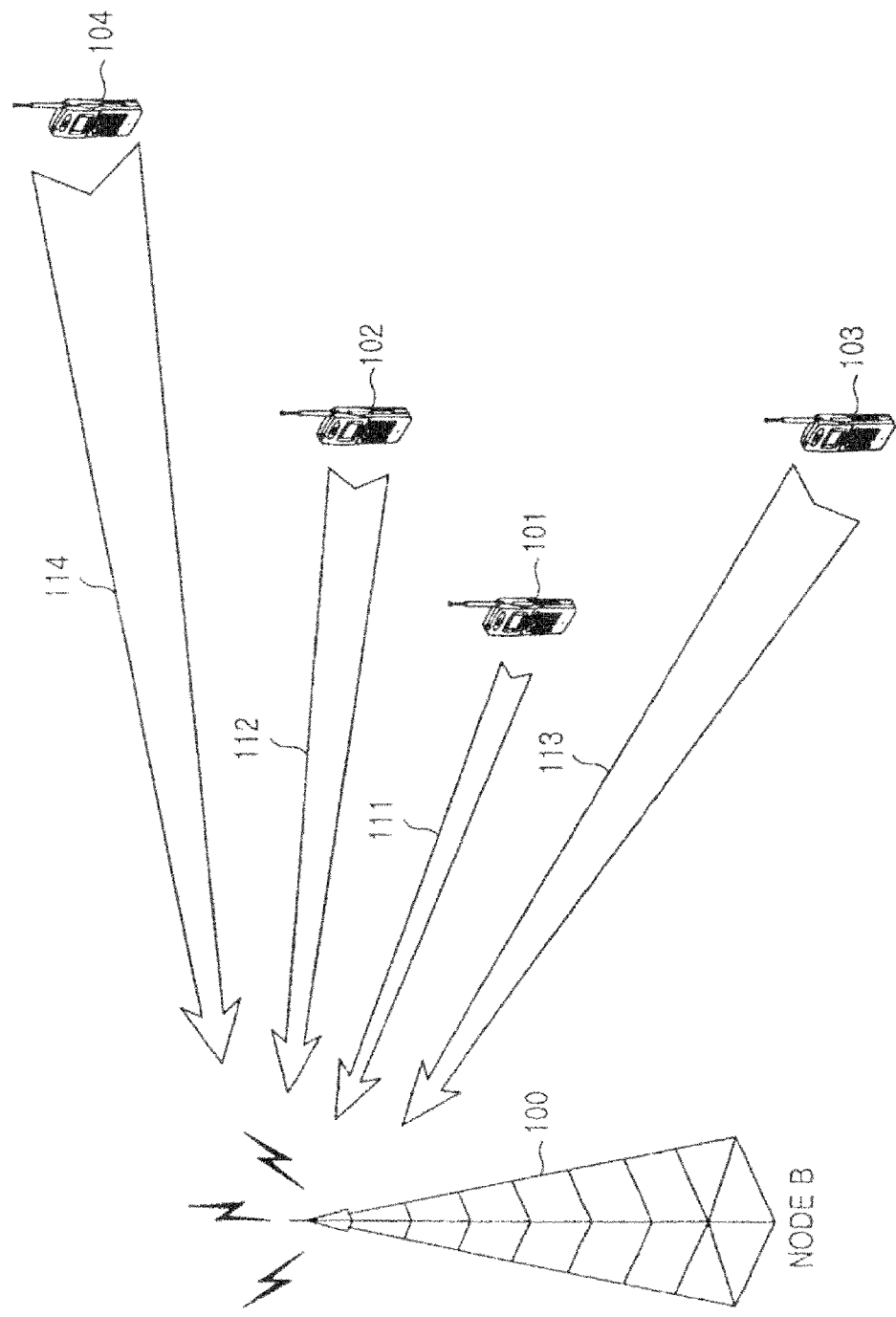
FIG. 1 illustrates uplink packet transmissions through enhanced uplink dedicated channels (E-DCHs) in a conventional wireless communication system.
Figure 2:
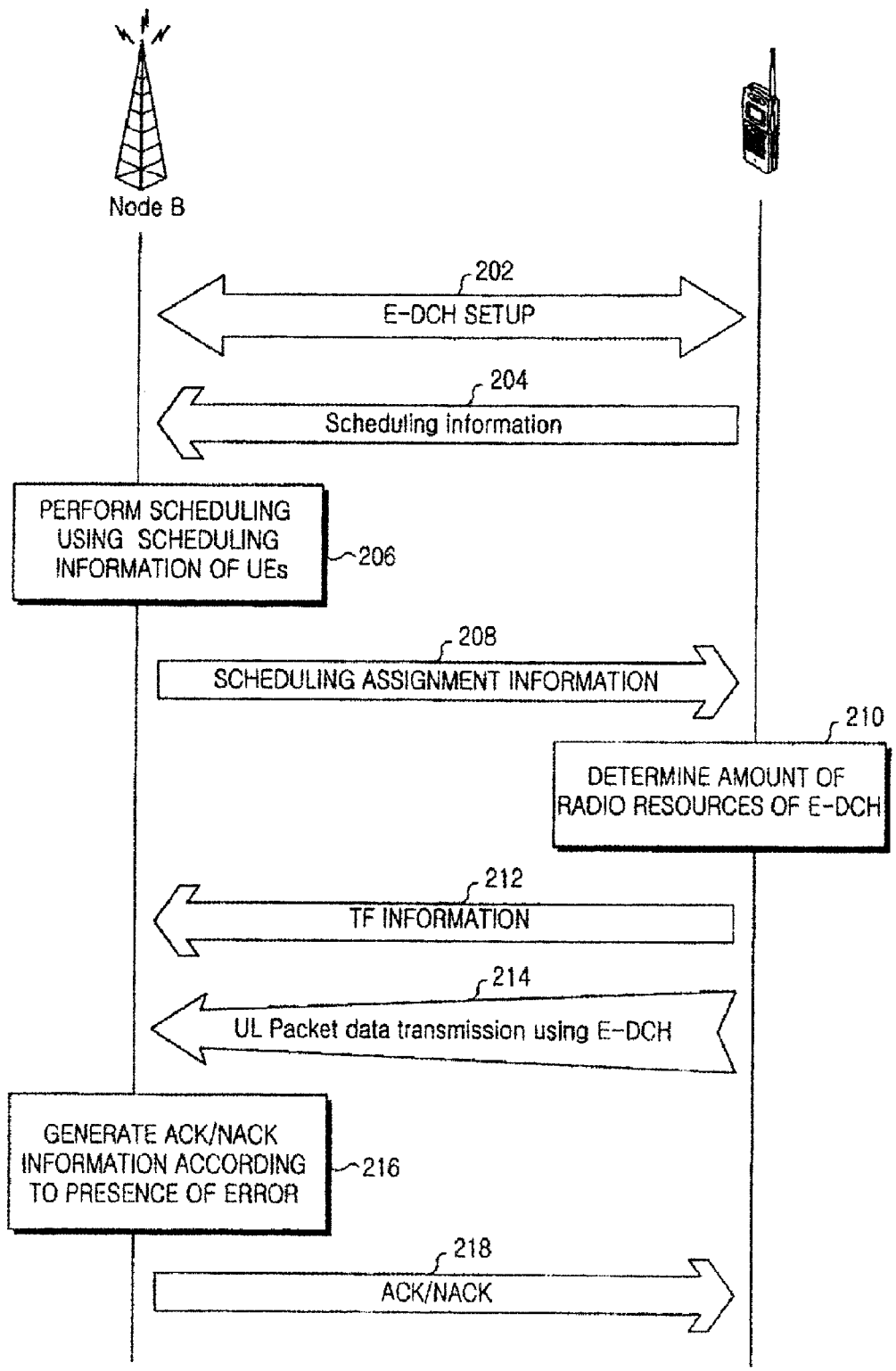
FIG. 2 is a message flow diagram illustrating a transmission and reception process through a conventional E-DCH.
Figure 3:
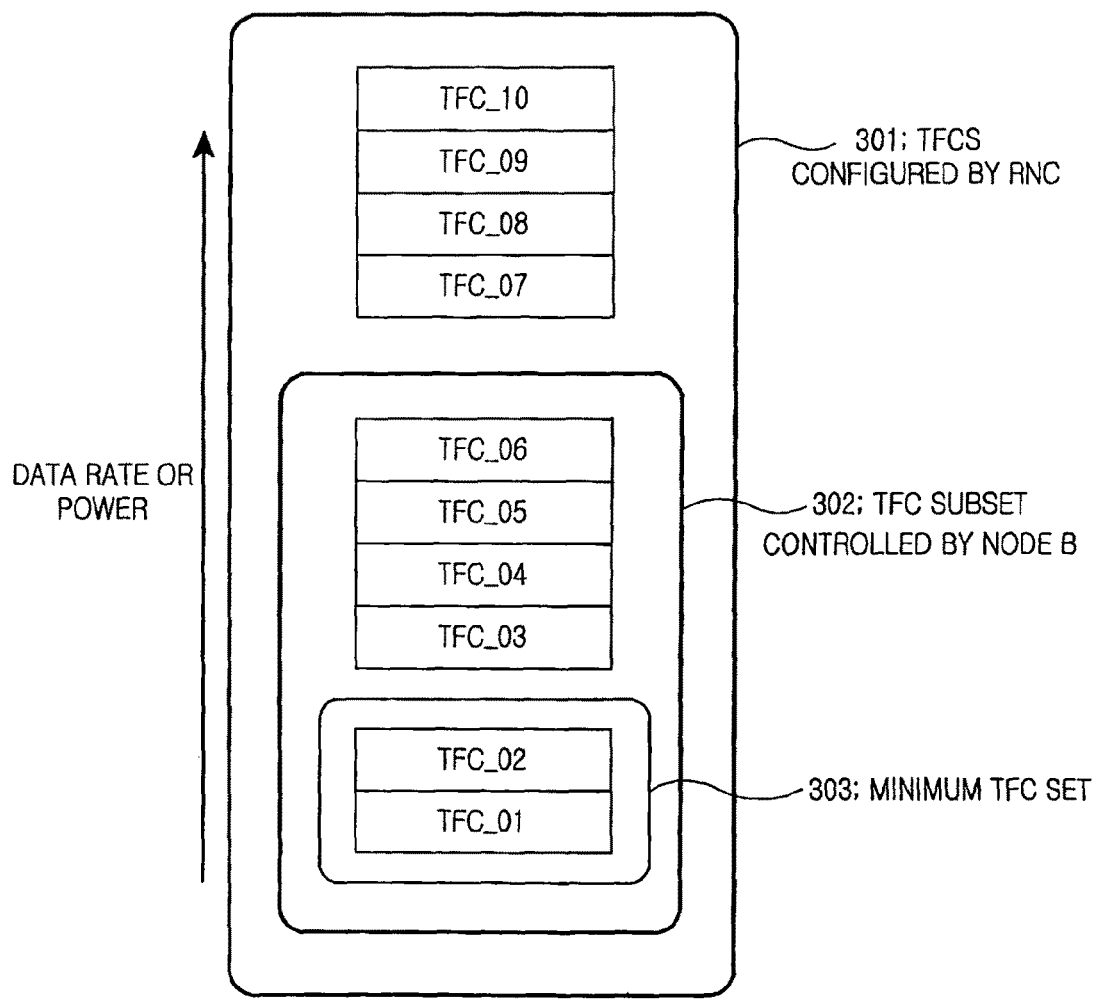
FIG. 3 illustrates transport format combinations (TFCs) of an E-DCH for controlling a data rate of a user equipment (UE)

Exemplary embodiments of the present invention will be described in detail herein below with reference to the accompanying drawings. In the following description, detailed descriptions of functions and configurations incorporated herein that are well known to those skilled in the art are omitted for the sake of clarity and conciseness. It is to be understood that the phraseology and terminology employed herein are for the purpose of description and should not be regarded as limiting the present invention.

Now, autonomous transmission, such as non-scheduled transmission, for an enhanced uplink dedicated channel (E-DCH) in a universal mobile telecommunication service (UMTS) communication system will be described. Because the data rate and transmission power have a one-to-one correspondence relation in the UMTS communication system, they are used together in the specification.

The Node B controlled scheduling is technology for improving system throughput and service coverage by efficiently controlling uplink resources in the Node B. According to the Node B controlled scheduling, non-scheduled transmission is possible at a data rate within a predetermined limit or for data flow of a specific service. In this case, uplink interference due to a high uplink data rate needs to be reduced. When data is transmitted at a data rate lower than the minimum data rate according to a user request, a variable effective data rate needs to be provided.

The non-scheduled transmission can quickly transmit E-DCH data by omitting a series of processes for sending scheduling information from the UE to the Node B and receiving scheduling assignment information from the Node B. A delay sensitive service, a signaling radio bearer (SRB) for quickly transmitting high layer signaling information, a guaranteed bit rate (GBR) service for ensuring a predetermined data rate, scheduling information (including initial buffer status information and initial power information of a UE necessary for the Node B controlled scheduling), and so on can be provided through the non-scheduled transmission.

An non-scheduled transmission period is denoted by N, and non-scheduled transmission can be performed the predetermined number of times k within the non-scheduled transmission period N. The parameters N and k are expressed in units of TTIs serving as units of E-DCH data transmission. That is, the non-scheduled transmission can be performed during k TTIs among N TTIs and an effective data rate can be varied, such that system performance is optimized. Here, k denotes the number of non-scheduled transmissions, and the effective data rate is a transmission rate of data for non-scheduled transmission.

When a transmission rate of data to be transmitted through non-scheduled transmission for an E-DCH is denoted by R, E-DCH data having the data rate R is transmitted during the k TTIs among the N TTIs, where k is less than or equal to N. In this case, the effective data rate is reduced to R×k/N, such that uplink interference is reduced. For example, when 320-bit data is transmitted during a TTI of 20 ms, the data rate of E-DCH data is relatively high, such as 160 kbps (=320 bits/2 ms). When the 320-bit data is transmitted using N=5 and k=1, the effective data rate is reduced to 32 kbps (=160 kbps×⅕). When E-DCH data is transmitted during the k TTIs among the N TTIs, the transmission time intervals of the E-DCH data are distributed on a UE-by-UE basis and therefore uplink interference is reduced in the overall system.

If the minimum transport format combination (TFC) set is configured for each UE when a TFC set (TFCS) for an E-DCH is configured, each UE can perform non-scheduled transmission within a transmission range included in the minimum TFC set. In this case, information about the TFCS, radio resources or a data rate available in non-scheduled transmission is defined according to the system design. The non-scheduled transmission period N and the number of non-scheduled transmissions k are values determined by taking into account an effective data rate and a transmission delay time allowable according to radio resource information of each UE, each data type, or a rise over thermal (RoT) level in a cell. The parameters N and k are defined on a UE-by-UE basis when an E-DCH is initially established or reestablished. When the E-DCH is initially established, non-scheduled transmission time intervals are set to be different on the UE-by-UE basis.

In accordance with an exemplary embodiment of the present invention, the non-scheduled transmission period N and the number of non-scheduled transmissions k are set on the UE-by-UE basis when the E-DCH is initially established or reestablished. However, when a specific event occurs, such as the number of UEs using E-DCHs in the cell is changed, the parameters can be changed. The parameters can be set in an individual UE unit, a cell unit, or a predetermined UE group unit.

Figure 4:
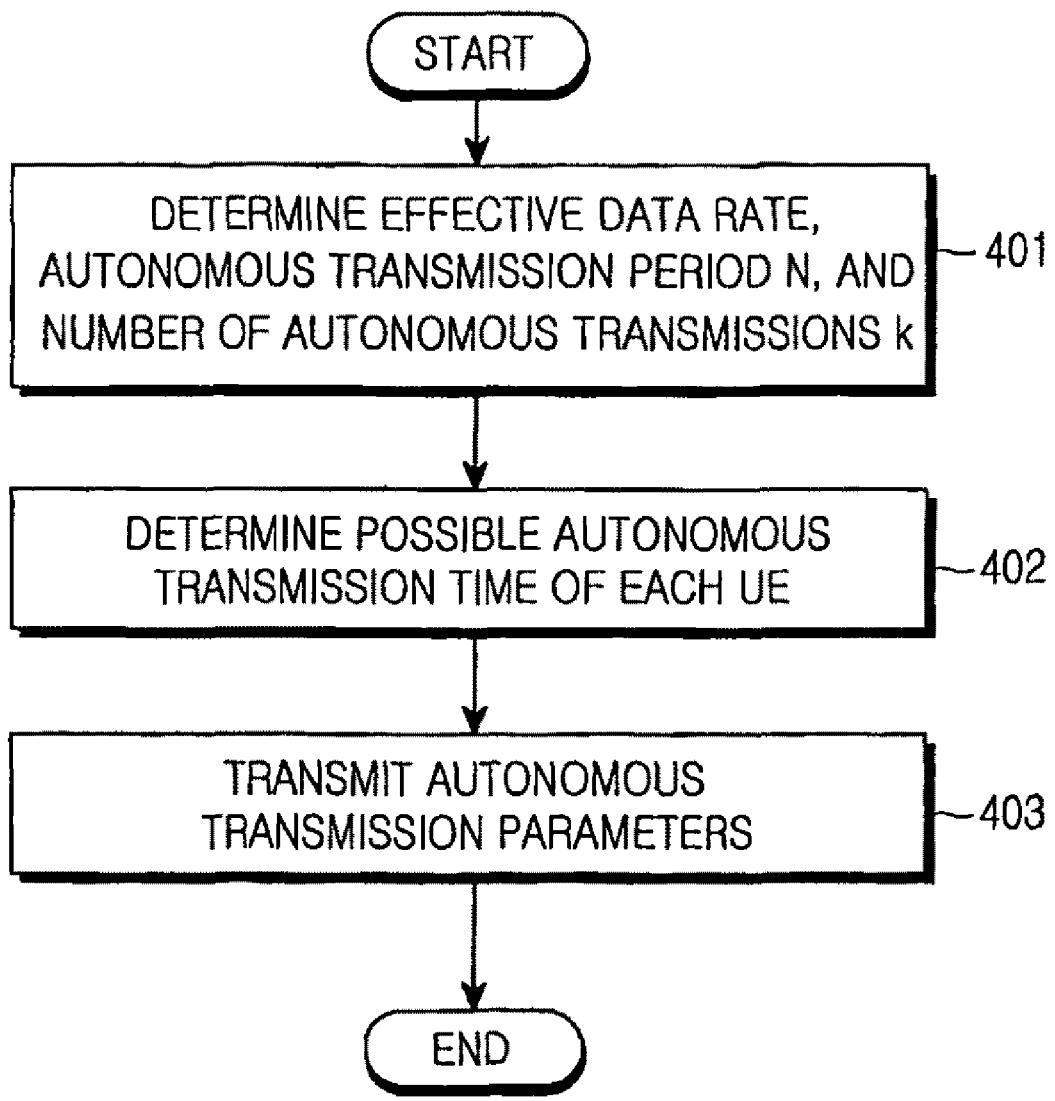
FIG. 4 is a flow chart illustrating a procedure for determining parameters for non-scheduled transmission for an E-DCH in accordance with an embodiment of the present invention.

FIG. 4 is a flow chart illustrating a procedure for determining parameters for non-scheduled transmission for an E-DCH in accordance with an exemplary embodiment of the present invention. The following procedure is performed by a radio network controller (RNC) for controlling radio resources of a UE.

In step 401, the RNC determines an effective data rate allowable for non-scheduled transmission by considering UE capacity and required quality of service (QoS) according to each UE or data type. In this case, the number of UEs using an E-DCH service within a cell to be controlled, an RoT level within each cell, and so on may additionally be considered. In case of high UE capacity, high QoS, the small number of UEs using the E-DCH service, or a high RoT level available in the cell, an effective data rate for non-scheduled transmission is set to be high. The above-described conditions are individually used or a combination of several conditions is used.

The non-scheduled transmission period N and the number of non-scheduled transmissions k are determined by taking into account the maximum transmission delay time allowed according to the condition of 'Effective Data Rate=Data Transmission Rate×k/N'. The non-scheduled transmission period N is determined by taking into account the allowable maximum transmission delay time. The number of non-scheduled transmissions k is defined such that the effective data rate can be satisfied. The parameters N and k are integers greater than 0, and k is less than or equal to N. For example, when an E-DCH data rate associated with the minimum TFC set in the TTI of 2 ms is 160 kbps and non-scheduled transmission is performed within a maximum of 40 ms, which is 20 TTIs, the effective data rate for the non-scheduled transmission is a minimum of 8 kbps according to 160 kbps×k/20.

In step 402, the RNC distributes possible non-scheduled transmission time intervals of respective UEs to uniformly reduce a total RoT level on the basis of the parameters N and k. The non-scheduled transmission time intervals for the UEs are set within the non-scheduled transmission period N by taking into account the parameters N and k, the number of UEs using the E-DCH service within the cell, and so on such that they do not overlap with each other. If N and k values are the same between the UEs using the E-DCH service within the cell, a probability in which the non-scheduled transmission time intervals for the UEs overlap with each other is reduced to a ratio of about k/N. That is, when the N and k values are the same between the UEs using the E-DCH service within one cell and the possible non-scheduled transmission time intervals for the UEs are different from each other, interference due to non-scheduled transmission within the cell is reduced to a ratio of k/N in an ideal case.

In step 403, the RNC sends non-scheduled transmission parameters indicating the determined N and k values and the possible non-scheduled transmission time intervals set on the basis of the N and k values to the Node B and the UEs through signaling. The RNC can give notification of information to be used to determine the possible non-scheduled transmission time intervals or can directly give notification of the set possible non-scheduled transmission time intervals using a bit map.

Each UE determines a TTI possible for non-scheduled transmission using a connection frame number (CFN) and a subframe number used for synchronization between the Node B and the UE. The CFN serves as a number assigned in a frame unit when data is accessed and has one value of 0~255. When an E-DCH TTI is 2 ms, a subframe is configured in a unit of 2 ms including 3 slots within one frame interval of 10 ms. Accordingly, 5 subframes form one frame and a subframe number has one value of 0~4. The UE computes Equations (1) and (2) according to TTI lengths.

Non-scheduled Transmission Determination Value 10 ms TTI=CFN mod N    Equation (1)

Non-scheduled Transmission Determination Value 2 ms TTI=TTI Number mod $N$=(CFN×5+Subframe Number)mod $N$    Equation (2)

In Equations (1) and (2), 'mod' denotes modulo operation. For example, 'a mod b' is the remainder of division of 'a' by 'b'.

When the non-scheduled transmission is performed, the UE computes an non-scheduled transmission determination value in each CFN by computing Equation (1) or (2) according to the current CFN, subframe number and TTI length. During TTIs in which the non-scheduled transmission determination values computed by Equations (1) and (2) correspond to possible non-scheduled transmission time intervals signaled from the RNC when an E-DCH is initially established or reestablished, such as during k TTIs of the non-scheduled transmission period N, the UE transmits E-DCH data without the Node B's scheduling. If a timing relation between a TTI number or CFN and the non-scheduled transmission period N is not clearly defined in Equations (1) and (2), the mismatch between a possible non-scheduled transmission time interval determined by a network and a possible non-scheduled transmission time interval determined by a UE may occur. At a time interval when a TTI number (in case of a TTI of 2 ms) or a CFN (in case of a TTI of 10 ms) is an integer multiple of the non-scheduled transmission period N, the non-scheduled transmission period N is initiated.

The possible non-scheduled transmission time interval for the UE is not limited to a specific time interval, but can be set such that data is transmitted at an arbitrary time interval. That is, when an E-DCH is initially established or reestablished, the UE is allowed to arbitrarily determine a possible non-scheduled transmission time interval. Accordingly, the UE can perform k data transmissions at arbitrary time intervals during a given non-scheduled transmission period N. For example, the UE performs non-scheduled transmission when non-scheduled transmission data is generated. That is, the UE can transmit non-scheduled transmission data as soon as the data is generated. Of course, the number of data transmissions of the UE is limited to k TTIs among N TTIs.

An example of non-scheduled transmission based on the length of an E-DCH TTI will be described. First, non-scheduled transmission of each UE in case of an E-DCH TTI of 10 ms will be described.

Figure 5:
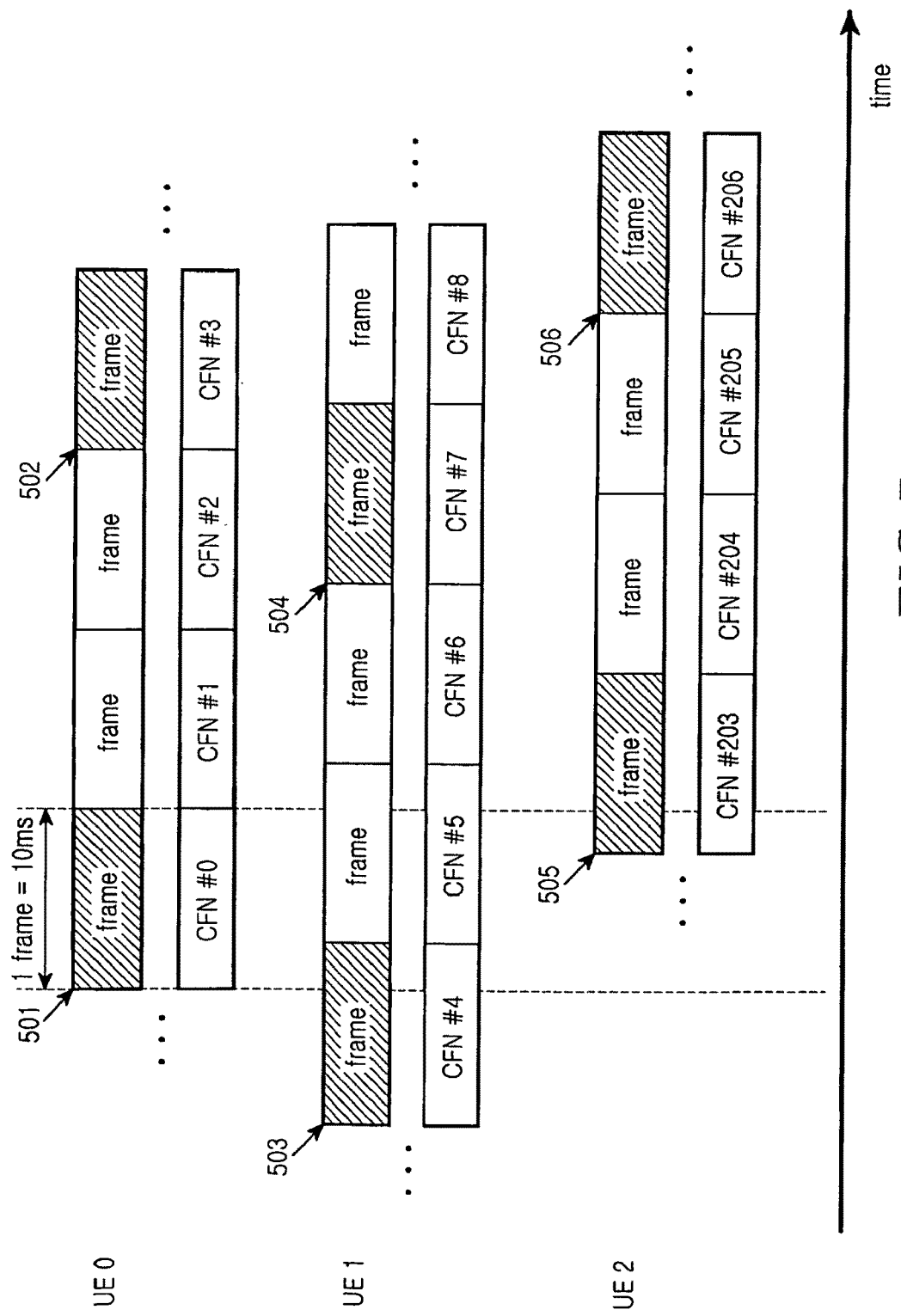
FIG. 5 is a timing diagram illustrating non-scheduled transmission time intervals for UEs when an E-DCH transmission time interval (TTI) is 10 ms in accordance with an embodiment of the present invention.

FIG. 5 is an exemplary timing diagram illustrating non-scheduled transmission time intervals for UEs in the case of an E-DCH TTI of 10 ms in accordance with an embodiment of the present invention. In FIG. 5, all the non-scheduled transmission periods N for UE 0, UE 1, and UE 2 are 3, and all the values representing the number of non-scheduled transmissions k for UE 0, UE 1, and UE 2 are 1. When an E-DCH is initially established or reestablished, the values representing possible non-scheduled transmission time intervals of UE 0, UE 1, and UE 2 are 0, 1, and 2, respectively. The E-DCH transmission time intervals for the UEs are not synchronized with each other.

The UE 0 finds time intervals at which an non-scheduled transmission determination value computed by Equation (1) corresponds to the set possible non-scheduled transmission time interval 0. When CFN=0 and CFN=3, the non-scheduled transmission determination values are 0 mod 3 and 3 mod 3 that correspond to the set non-scheduled transmission time interval 0. As indicated by reference numerals 501 and 502, The UE 0 performs non-scheduled transmission in frame intervals of CFN 0 and CFN 3.

The UE 1 finds time intervals at which an non-scheduled transmission determination value computed by Equation (1) corresponds to the set possible non-scheduled transmission time interval 1. For instance, when CFN=4 and CFN=7, the non-scheduled transmission determination values are 4 mod 3 (=1) and 7 mod 3 (=1) that correspond to the set non-scheduled transmission time interval 1. As indicated by reference numerals 503 and 504, the UE 1 performs non-scheduled transmission in frame intervals of CFN 4 and CFN 7.

Similarly, UE 2 finds time intervals at which an non-scheduled transmission determination value computed by Equation (1) corresponds to the set possible non-scheduled transmission time interval 2. For instance, when CFN=203 and CFN=206, the non-scheduled transmission determination values are 203 mod 3 (=2) and 206 mod 3 (=2) that correspond to the set non-scheduled transmission time interval 2. As indicated by reference numerals 505 and 506, the UE 2 performs non-scheduled transmission in frame intervals of CFN 203 and CFN 206.

Next, the non-scheduled transmission of each UE in the case of an E-DCH TTI of 2 ms will be described in more detail.

Figure 6:
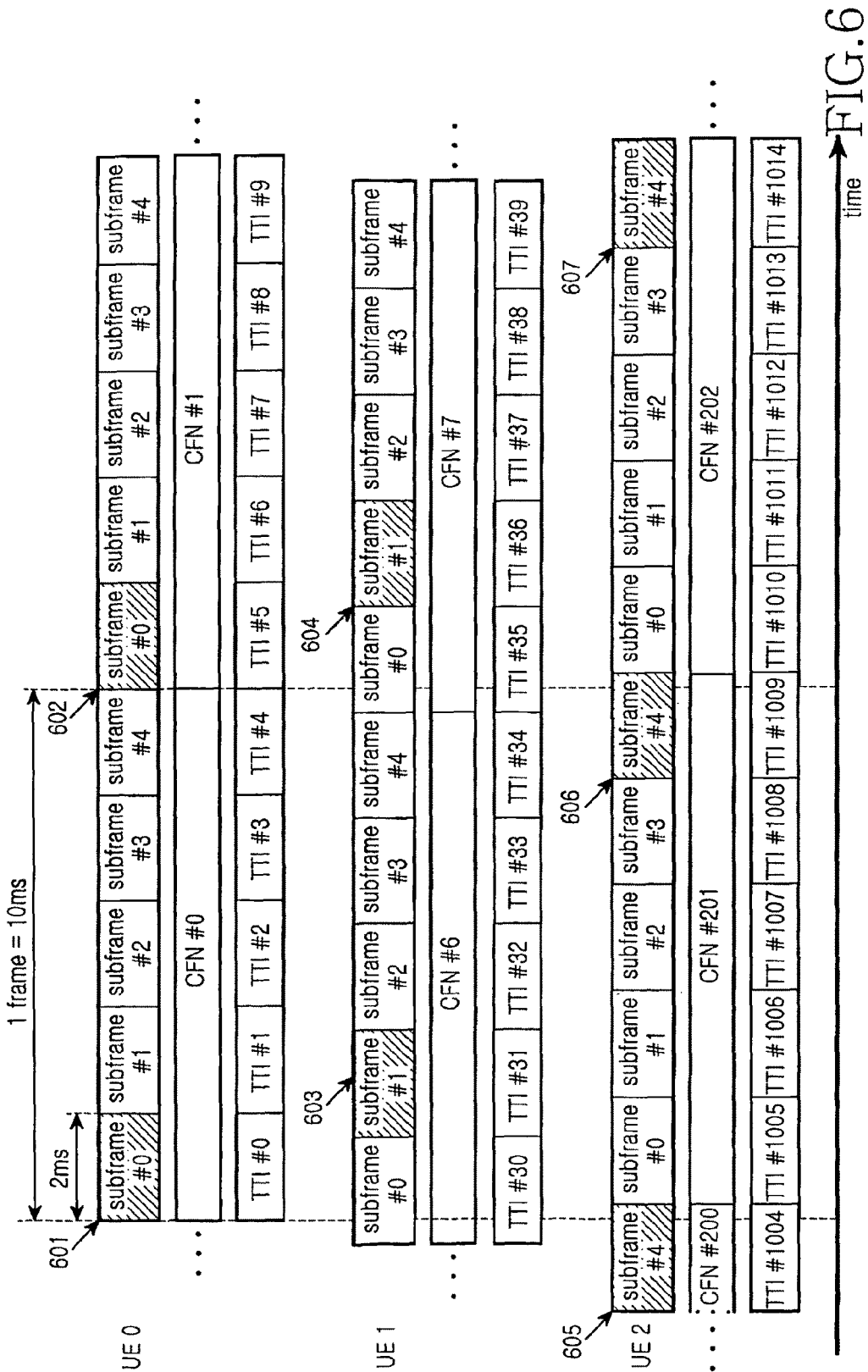
FIG. 6 is a timing diagram illustrating non-scheduled transmission time intervals for UEs when an E-DCH TTI is 2 ms in accordance with a preferred embodiment of the present invention.

FIG. 6 is an exemplary timing diagram illustrating non-scheduled transmission time intervals for UEs in case of an E-DCH TTI of 2 ms in accordance with an embodiment of the present invention. In FIG. 6, all non-scheduled transmission periods N of UE 0, UE 1, and UE 2 are 5, and all values representing the number of non-scheduled transmissions k of UE 0, UE 1, and UE 2 are 1. When an E-DCH is initially established or reestablished, the values representing possible non-scheduled transmission time intervals of UE 0, UE 1, and UE 2 are 0, 1, and 4, respectively. E-DCH transmission time intervals for the UEs are not synchronized with each other.

The UE 0 finds time intervals at which an non-scheduled transmission determination value computed by Equation (2) corresponds to the set possible non-scheduled transmission time interval 0. In the exemplary cases of CFN=0 and Subframe Number=0, and CFN=1 and Subframe Number=0, the non-scheduled transmission determination values are (0×5+0)mod 5 (=0) and (1×5+0)mod 5 (=0) that correspond to the set non-scheduled transmission time interval 0. As indicated by reference numerals 601 and 602, the UE 0 performs non-scheduled transmission in the subframe intervals of TTI #0 and TTI #5.

The UE 1 finds the time intervals at which an non-scheduled transmission determination value computed by Equation (2) corresponds to the set possible non-scheduled transmission time interval 1. In the exemplary cases of CFN=6 and Subframe Number=1, and CFN=7 and Subframe Number=1, the non-scheduled transmission determination values are (6×5+1)mod 5 (=1) and (7×5+1)mod 5 (=1) that correspond to the set non-scheduled transmission time interval 1. As indicated by reference numerals 603 and 604, the UE 1 performs non-scheduled transmission in subframe intervals of TTI #31 and TTI #36.

Similarly, the UE 2 finds time intervals at which an non-scheduled transmission determination value computed by Equation (2) corresponds to the set possible non-scheduled transmission time interval 4. In the exemplary cases of CFN=200 and Subframe Number=4, CFN=201 and Subframe Number=1, and CFN=202 and Subframe Number=4, the non-scheduled transmission determination values are (200×5+4)mod 5 (=4), (201×5+4)mod 5 (=4), and (202×5+4)mod 5 (=4) that correspond to the set non-scheduled transmission time interval 4. As indicated by reference numerals 605, 606, and 607, the UE 2 performs non-scheduled transmission in subframe intervals of TTI #1004, TTI #1009, and TTI #1014.

A method for arbitrarily determining an non-scheduled transmission time interval as described above can be taken into account. For example, the arbitrary non-scheduled transmission time is a time interval when data for non-scheduled transmission is generated.

The embodiments based on the cases of TTIs of 10 ms and 2 ms have been described. Of course, those skilled in the art will appreciate that possible non-scheduled transmission time intervals can be provided using a CFN and a subframe number associated with a different TTI length. When the TTI length is reduced to 1/n of 10 ms, Equation (2) is modified into Equation (3). In Equation (3), the subframe length is 10 ms/n, and n subframes configure one 10-ms frame. A subframe number has one value of 0~n−1.

Non-scheduled Transmission Determination Value= (CFN×$n$+Subframe Number)mod $N$     Equation (3)

As described above, the UE transmits E-DCH data through k transmissions during the non-scheduled transmission period N and has a relatively low effective data rate, when non-scheduled transmission for an E-DCH is performed. The non-scheduled transmission time for UEs have different values, such that an RoT level of the overall cell is reduced. When a TFCS is set for an initial E-DCH, the RNC notifies the Node B and each UE of the parameters N and k and a possible non-scheduled transmission time interval of each UE, such that the additional overhead can be minimized. When a specific event occurs, the parameters can be updated. Moreover, the parameters can be updated in a cell unit or a predetermined UE group unit rather than in an individual UE unit. The non-scheduled transmission based on the above-described manner is useful when a small size of data is transmitted in a stand-alone E-DCH state in which only an E-DCH is established without a DCH.

Figure 7:
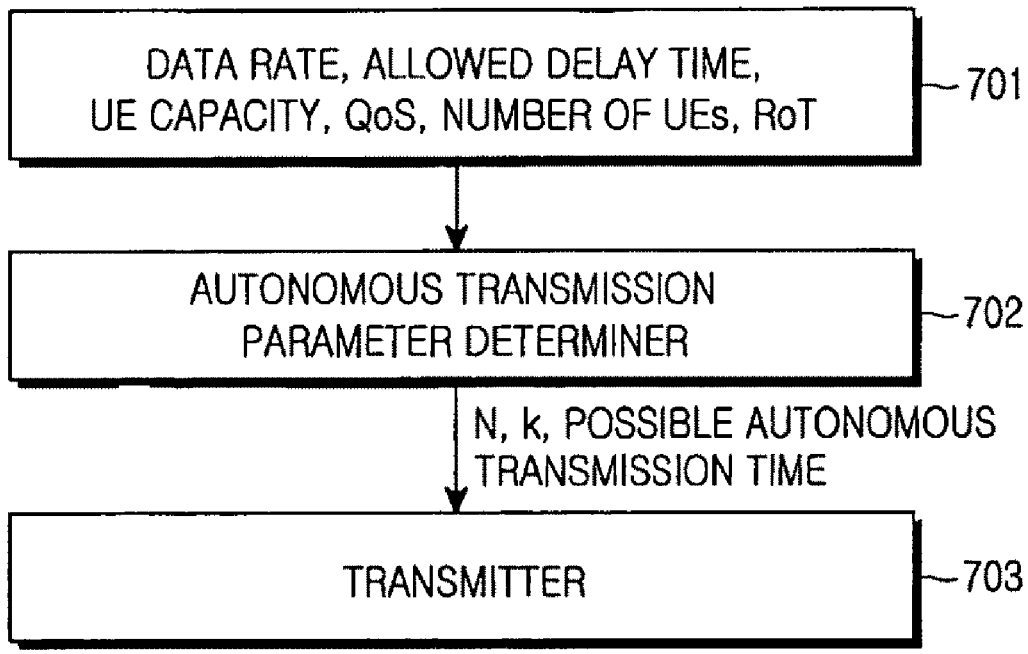
FIG. 7 illustrates an non-scheduled transmission parameter determiner in accordance with a preferred embodiment of the present invention.

FIG. 7 illustrates an apparatus for controlling non-scheduled transmission in accordance with a preferred embodiment of the present invention. The apparatus is provided in the UMTS system, preferably in the RNC.

Referring to FIG. 7, input information 701 necessary to operate an non-scheduled transmission parameter determiner 702 comprises the UE capacity, QoS, the maximum transmission delay time allowed for the non-scheduled transmission, the number of UEs using the E-DCH service in the cell, the RoT level available in the cell, the E-DCH data rate for non-scheduled transmission within the minimum TFC set, and so on. The operation of the non-scheduled transmission parameter determiner 702 has been described above. That is, the non-scheduled transmission parameter determiner 702 determines the non-scheduled transmission parameters such as an non-scheduled transmission period N, the number of non-scheduled transmissions k, and a possible non-scheduled transmission time interval of each UE from the input information 701 such that an effective data rate is relatively low and the associated transmission time intervals do not overlap with each other. A transmitter sends the determined non-scheduled transmission parameters 703 to the Node B and each UE through signaling.

Figure 8:
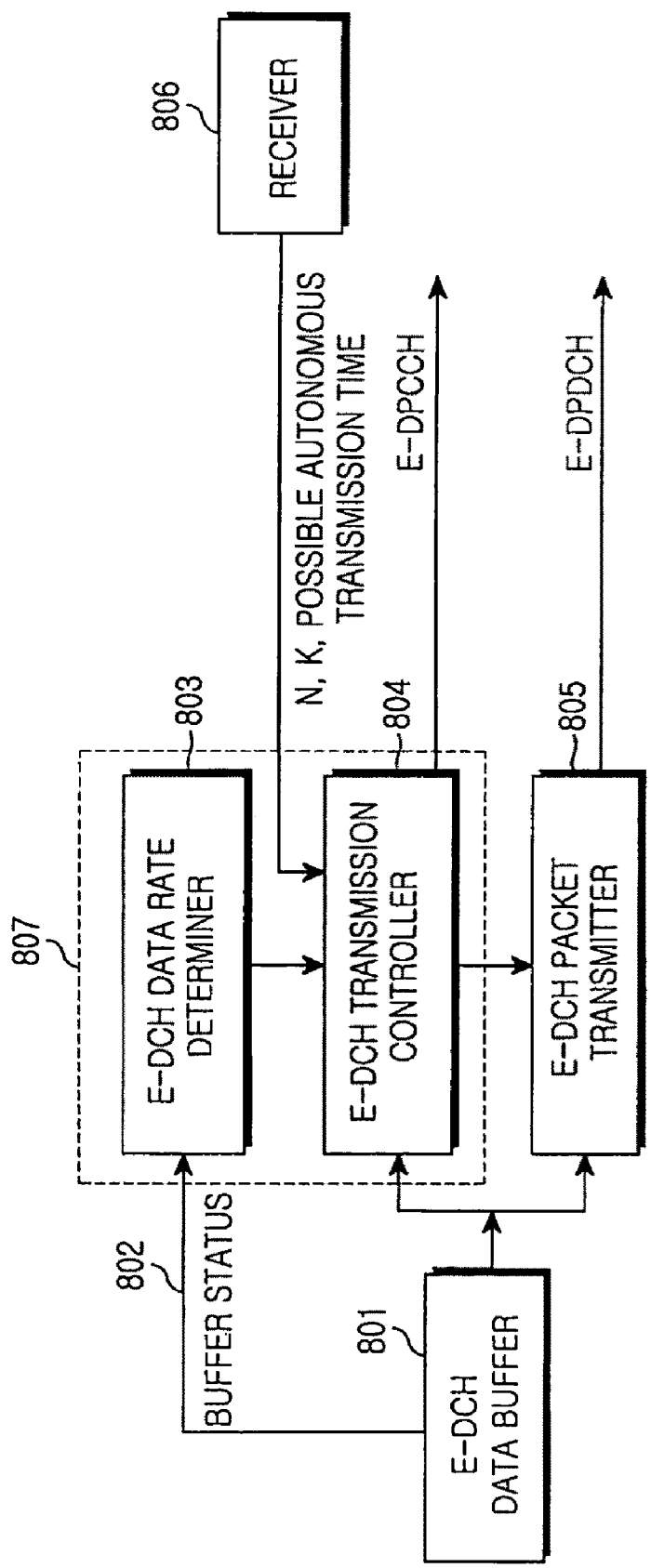
FIG. 8 is a block diagram illustrating a transmitter of a UE for performing non-scheduled transmission in accordance with a preferred embodiment of the present invention.

FIG. 8 is a block diagram illustrating an exemplary apparatus for performing non-scheduled transmission in the UE in accordance with an embodiment of the present invention. Components, associated with an E-DCH, for performing non-scheduled transmission are only illustrated in FIG. 8. Accordingly, the apparatus may comprise components that are not shown or described.

In FIG. 8, a receiver of the UE receives, from the RNC, non-scheduled transmission parameters such as an non-scheduled transmission period N, the number of non-scheduled transmissions k, a possible non-scheduled transmission time interval, and so on. An E-DCH controller 807 for controlling an E-DCH packet transmitter 805 comprises an E-DCH data rate determiner 803 and an E-DCH transmission controller 804. The E-DCH data rate determiner 803 obtains buffer status information 802 indicating an amount of buffered E-DCH data from an E-DCH data buffer 801 storing data to be transmitted through an E-DCH. The E-DCH data rate determiner 803 determines an E-DCH data rate by considering currently available transmission power of the UE, UE capacity of the cell, a currently available TFCS, and the buffer status information 802. If the set E-DCH data rate or TFC belongs to the minimum set or E-DCH data stored in the data buffer 801 is available for the non-scheduled transmission service, the E-DCH transmission controller 804 determines to transmit the buffered E-DCH data through non-scheduled transmission without scheduling. As described above, when the non-scheduled transmission is performed, the E-DCH is present in non-scheduled transmission mode.

The E-DCH transmission controller 804 determines an E-DCH transport format according to the determined E-DCH data rate, and applies the determined E-DCH transport format to an E-DCH packet transmitter 805. The E-DCH transmission controller 804 determines an non-scheduled transmission time interval of E-DCH data from non-scheduled transmission parameters received from the receiver 806 such as the possible non-scheduled transmission time interval, the transmission period N, the number of non-scheduled transmissions k, and so on. The control information indicating the E-DCH transport format is sent to the Node B through an enhanced dedicated physical control channel (E-DPCCH) serving as a physical control channel for an E-DCH. The E-DCH packet transmitter 805 fetches a designated amount of E-DCH data from the E-DCH data buffer 801 on the basis of the E-DCH transport format and the non-scheduled transmission time interval. The fetched E-DCH data is transmitted through an enhanced dedicated physical data channel (E-DPDCH) serving as a physical data channel for an E-DCH after channel coding and modulation.

If the E-DCH data rate or TFC determined by the E-DCH data rate determiner 803 does not belong to the minimum set or E-DCH data stored in the data buffer 801 is unavailable for the non-scheduled transmission service, the E-DCH transmission controller 804 cannot transmit the E-DCH data through non-scheduled transmission. In this case, the E-DCH transmission controller 804 determines an E-DCH transport format according to the determined E-DCH data rate and scheduling assignment information reported from the Node B, and applies the determined E-DCH transport format to the E-DCH packet transmitter 805. When the reported scheduling assignment information is used, the E-DCH is present in a Node B controlled scheduling mode. The scheduling assignment information is determined by the Node B's scheduler according to the scheduling information reported from the UE to the Node B, for instance buffer status information indicating an amount of data to be transmitted and power information indicating transmission power.

Similarly, the information indicating the E-DCH transport format is sent through the E-DPCCH serving as the physical control channel for an E-DCH. The E-DCH packet transmitter 805 fetches a designated amount of E-DCH data from the E-DCH data buffer 801 on the basis of the E-DCH transport format. The fetched E-DCH data is transmitted through the E-DPDCH serving as the physical data channel for an E-DCH after channel coding and modulation.

FIG. 9 is a time diagram illustrating non-scheduled transmission time intervals for UEs when an E-DCH TTI is 2 ms in accordance with an embodiment of the present invention. In FIG. 9, all UEs have the non-scheduled transmission period N of 8 and the number of non-scheduled transmissions k of 3. When an E-DCH is initially established or reestablished, the RNC sets the possible non-scheduled transmission time intervals for the UEs while considering a cell status. The UE 0 has possible non-scheduled transmission time intervals in the $0^{th}$, $3^{rd}$, and $6^{th}$ TTIs within the non-scheduled transmission period N=8. The UE 1 has possible non-scheduled transmission time intervals in the $1^{st}$, $4^{th}$, and $7^{th}$ TTIs within the non-scheduled transmission period N=8. UE 2 has possible non-scheduled transmission time intervals in the $0^{th}$, $2^{nd}$, and $5^{th}$ TTIs within the non-scheduled transmission period N=8. The E-DCH transmission time intervals for the UEs are preferably not synchronized with each other.

The RNC notifies the Node B and each UE of the possible non-scheduled transmission time intervals through signaling. The RNC determines the possible non-scheduled transmission time intervals by considering the capacity and the QoS of each UE, the maximum transmission delay time allowed for non-scheduled transmission, the number of UEs using the E-DCH service in a cell, an RoT level available in the cell, an E-DCH data rate for non-scheduled transmission within the minimum TFC set, and so on. The above-described conditions are individually used or a combination of several conditions is used.

The RNC notifies each UE of the possible non-scheduled transmission time intervals and impossible non-scheduled transmission time intervals in a bit map format. For example, because UE 0 has possible non-scheduled transmission time intervals in the $0^{th}$, $3^{rd}$, and $6^{th}$ TTIs within the non-scheduled transmission period N=8, the bit map format indicating the possible non-scheduled transmission time intervals for UE 0 is reported using [1, 0, 0, 1, 0, 0, 1, 0]. In this case, the size of the bit map equals the non-scheduled transmission period N. A bit position and a TTI number within the non-scheduled transmission period N have a one-to-one correspondence relation. In the bit map, '1' denotes possible non-scheduled transmission and '0' denotes impossible non-scheduled transmission.

In this case, to define an accurate timing relation between the non-scheduled transmission period N and the number of E-DCH TTIs within one frame (for instance, 5 TTIs in case of a 2-ms TTI or 1 TTI in case of a 10-ms TTI), a time interval at which an E-DCH TTI number (in case of the 2-ms TTI) or a CFN (in case of the 10-ms TTI) is an integer multiple of the non-scheduled transmission period N that corresponds to a start time interval of the non-scheduled transmission period N.

Similarly, because the UE 1 has the possible non-scheduled transmission time intervals in the $1^{st}$, $4^{th}$, and $7^{th}$ TTIs within the non-scheduled transmission period N=8, the bit map format indicating the possible non-scheduled transmission time intervals for the UE 1 is reported using [0, 1, 0, 0, 1, 0, 0, 1]. Because the UE 2 has the possible non-scheduled transmission time intervals in the $0^{th}$, $2^{nd}$, and $5^{th}$ TTIs within the non-scheduled transmission period N=8, the bit map format indicating the possible non-scheduled transmission time intervals for UE 2 is reported using [1, 0, 1, 0, 0, 1, 0, 0].

The UE 0 finds the time intervals at which the non-scheduled transmission determination values computed by Equation (2) correspond to the set of possible non-scheduled transmission time intervals in the $0^{th}$, $3^{rd}$, and $6^{th}$ TTIs within the set non-scheduled transmission period N=8. For example, when the CFN=0 and Subframe Number=0, the non-scheduled transmission determination value is (0×5+0)mod 8 (=0) that corresponds to the set non-scheduled transmission time interval 0. For example, when the CFN=0 and Subframe Number=3, the non-scheduled transmission determination value is (0×5+3)mod 8 (=3) that corresponds to the set non-scheduled transmission time interval 3. For example, when the CFN=1 and Subframe Number=1, the non-scheduled transmission determination value is (1×5+1)mod 8 (=6) that corresponds to the set non-scheduled transmission time interval 6. The UE 0, for example, performs non-scheduled transmission in subframes of TTI #0 901, TTI #3 902, and TTI #6 903.

The UE 1 finds time intervals at which non-scheduled transmission determination values computed by Equation (2) correspond to the set of possible non-scheduled transmission time intervals in the $1^{st}$, $4^{th}$, and $7^{th}$ TTIs within the set non-scheduled transmission period N=8. For example, when the CFN=8 and Subframe Number=1, the non-scheduled transmission determination value is (8×5+1)mod 8 (=1) that corresponds to the set non-scheduled transmission time interval 1. For example, when the CFN=8 and Subframe Number=4, the non-scheduled transmission determination value is (8×5+4)mod 8 (=4) that corresponds to the set non-scheduled transmission time interval 4. When CFN=9 and Subframe Number=2, the non-scheduled transmission determination value is (9×5+2)mod 8 (=7) that corresponds to the set non-scheduled transmission time interval 7. The UE 1, for example, performs non-scheduled transmission in subframes of TTI #41 904, TTI #44 905, and TTI #47 906.

The UE 2 finds the time intervals at which non-scheduled transmission determination values computed by Equation (2) correspond to the set possible non-scheduled transmission time intervals in the $0^{th}$, $2^{nd}$, and $5^{th}$ TTIs within the set non-scheduled transmission period N=8. For example, when CFN=200 and Subframe Number=0, the non-scheduled transmission determination value is (200×5+0)mod 8 (=0) that corresponds to the set non-scheduled transmission time interval 0. When CFN=200 and Subframe Number=2, the non-scheduled transmission determination value is (200×5+2)mod 8 (=2) that corresponds to the set non-scheduled transmission time interval 2. When CFN=201 and Subframe Number=0, the non-scheduled transmission determination value is (201×5+0)mod 8 (=5) that corresponds to the set non-scheduled transmission time interval 5. The UE 2, for example, performs non-scheduled transmission in subframes of TTI #1000 907, TTI #1002 908, and TTI #1005 909.

An apparatus for controlling non-scheduled transmission and an apparatus for performing non-scheduled transmission in the UE can be easily implemented using FIGS. 7 and 8 and therefore a detailed description is omitted.

The following embodiment discloses a method for performing k non-scheduled transmissions during the transmission period N when non-scheduled ramp-up scheduling is used according to an embodiment of the present invention. In this case, the UE performs k non-scheduled transmissions during the transmission period N also for a TFC that does not belong to the minimum TFC set, thereby reducing the amount of uplink interference.

An non-scheduled data rate ramp-up scheme is one of the methods for Node B controlled scheduling. According to the non-scheduled transmission ramp-up scheme, the UE transmits data while continuously and non-scheduledly increasing a data rate by a predefined increase amount up to an absolute grant (AG) indicating the maximum data rate allowed by the Node B when a significant amount of data to be transmitted from the buffer of the UE is present and available transmission power of the UE is sufficient. Accordingly, the UE can perform non-scheduled transmission within the AG assigned from the Node B, and the Node B manages the RoT of the cell through the AG.

When the number of UEs using a data rate corresponding to the AG allowed by the Node B or the number of UEs transmitting data at a high data rate close to the AG increases, excessive uplink interference occurs causing cell capacity reduction or a burden on the Node B hardware resources. To address these problems, embodiments of the present invention ensure non-scheduled transmission of a UE in the non-scheduled data rate ramp-up scheduling scheme and enables k non-scheduled transmissions within the non-scheduled transmission period N, thereby reducing the uplink interference and the burden of Node B hardware resources.

In this case, the non-scheduled transmission parameter determiner 702 of FIG. 7 refers to the AG indicating the maximum data rate of the UE allowed by the Node B in the non-scheduled data rate ramp-up scheme instead of referring to an E-DCH data rate for non-scheduled transmission within the minimum TFC set. When a data rate determined by the E-DCH data rate determiner 803 of FIG. 8 is included within the AG assigned from the Node B even though it does not belong to the minimum TFC set, the UE can perform non-scheduled transmission.

Although preferred embodiments of the present invention have been disclosed for illustrative purposes, those skilled in the art will appreciate that various modifications, additions, and substitutions are possible, without departing from the scope of the present invention. The cases where the UE performs non-scheduled transmission according to the minimum TFC set configured by the RNC or service characteristics of data to be transmitted or the case where non-scheduled ramp-up scheduling is used have been described above. Embodiments of the present invention are useful in the case where an arbitrary transport format is variably used in addition to a transport format preset according to a system. This case can be implemented through modification of the above-described embodiments. Therefore, the present invention is not limited to the above-described embodiments, but is defined by the following claims, along with their full scope of equivalents.

As apparent from the above description of the exemplary embodiment, the present invention has a number of advantages.

For example, embodiments of the present invention can efficiently perform non-scheduled transmission when an enhanced uplink dedicated transport channel is used. In the non-scheduled transmission, data can be transmitted in a state in which an effective data rate is lowered. In the non-scheduled transmission of the enhanced uplink dedicated transport channel, a control operation is performed such that transmission time intervals for UEs do not overlap with each other. Therefore, uplink interference can be reduced and additional signaling is minimized in the non-scheduled transmission.

What is claimed is:

1. A method for performing non-scheduled transmission in a user equipment (UE) of a mobile communication system for supporting an enhanced uplink dedicated channel (E-DCH), comprising the steps of:
   receiving non-scheduled transmission information indicating k transmission time intervals (TTIs) for transmitting non-scheduled data via the E-DCH, wherein non-scheduled transmissions can be performed during the k TTIs within a period having N TTIs; and
   transmitting data on at least one TTI of the k TTIs within the period;
   wherein the parameter k is an integer greater than 0 and less than or equal to a positive integer N.

2. The method of claim 1, wherein the non-scheduled transmission information is configured by a bit map of N bits indicating the k TTIs using specific bit values.

3. The method of claim 1, wherein the non-scheduled transmission information is determined according to an effective data rate and an allowed maximum transmission delay time, the effective data rate being determined by considering at least one of the capacity of UEs for providing an uplink packet data service, requested quality of service (QoS), the number of UEs, and uplink radio resources available in a cell.

4. The method of claim 1, wherein the data to be used for the non-scheduled transmission is defined by a service type or a data rate.

5. The method of claim 1, wherein the data comprise at least one of the data of a signaling radio bearer (SRB) for transmitting high layer signaling information, the data of a guaranteed bit rate (GBR) service for ensuring a predefined data rate, and the scheduling information as data for performing the non-scheduled transmission.

6. The method of claim 1, wherein the step of transmitting the data comprises the step of:
   transmitting the data within a data rate allowed by a radio network controller (RNC) on at least one of the k TTIs.

7. The method of claim 1, wherein the step of transmitting the data comprises the steps of:
   computing a non-scheduled transmission determination value according to a connection frame number (CFN) for generating a frame to be used in communication with a Node B accessed by the UE and a subframe number; and
   transmitting the data in TTIs in which non-scheduled transmission determination values correspond to values of the k TTIs.

8. The method of claim 7, wherein the non-scheduled transmission determination value is computed by (CFN*n+Subframe Number)mod N, where a TTI size of the E-DCH is 1/n of a frame length.

9. An apparatus for performing non-scheduled transmission in a user equipment (UE) of a mobile communication system for supporting an enhanced uplink dedicated channel (E-DCH), comprising:
   a receiver receiving non-scheduled transmission information indicating k transmission time intervals (TTIs) for transmitting non-scheduled data via the E-DCH, wherein non-scheduled transmissions can be performed during the k TTIs within a period having N TTIs; and
   a transmitter transmitting data on at least one TTI of the k TTIs within the period;
   wherein the k is an integer greater than 0 and less than or equal to a positive integer N.

10. The apparatus of claim 9, wherein the non-scheduled transmission information is configured by a bit map of N bits indicating the k TTIs using specific bit values.

11. The apparatus of claim 9, wherein the non-scheduled transmission information is determined according to an effective data rate and an allowed maximum transmission delay time, the effective data rate being determined by considering at least one of the capacity of UEs for providing an uplink packet data service, the requested quality of service (QoS), the number of UEs, and the uplink radio resource available in a cell.

12. The apparatus of claim 9, wherein the data to be used for the non-scheduled transmission is defined by a service type or a data rate.

13. The apparatus of claim 9, wherein the data comprise at least one of the data of a signaling radio bearer (SRB) for transmitting high layer signaling information, the data of a guaranteed bit rate (GBR) service for ensuring a predefined data rate, and the scheduling information as data for performing the non-scheduled transmission.

14. The apparatus of claim 9, wherein the transmitter transmits the data within a data rate allowed by a radio network controller (RNC) on at least one TTI of the k TTIs.

15. The apparatus of claim 9, wherein the transmitter computes a non-scheduled transmission determination value according to a connection frame number (CFN) for generating a frame to be used in communication with a Node B accessed by the UE and a subframe number, and transmits the data in TTIs in which non-scheduled transmission determination values correspond to values of the k TTIs.

16. The apparatus of claim 15, wherein the non-scheduled transmission determination value is computed by (CFN*n+Subframe Number)mod N, where a TTI size of the E-DCH is 1/n of a frame length.

17. A method for controlling non-scheduled transmission of a user equipment (UE) in a radio network controller (RNC)

of a mobile communication system for supporting an enhanced uplink dedicated channel (E-DCH), comprising the steps of:

setting k transmission time intervals (TTIs); and transmitting, to the UE, non-scheduled transmission information indicating the k TTIs for transmitting non-scheduled data via the E-DCH within a period having N TTIs;

wherein the non-scheduled transmissions can be performed during the k TTIs within the period, and the parameter k is an integer greater than 0 and less than or equal to a positive integer N.

18. The method of claim 17, wherein the setting step comprises the steps of:

determining an effective data rate for the non-scheduled transmission by considering at least one of the capacity of UEs for providing an uplink packet data service, requested quality of service (QoS), the number of UEs, and uplink radio resource available in a cell;

setting values of the N for performing non-scheduled transmission in the UE and the k according to the effective data rate and an allowed maximum transmission delay time; and determining the k TTIs that do not overlap between UEs using the values of the N and the k.

19. The method of claim 17, wherein the non-scheduled transmission information is configured by a bit map of N bits indicating the k TTIs using specific bit values.

20. The method of claim 17, wherein the non-scheduled transmission information is set for the data to be used for non-scheduled transmission according to a service type or a data rate.

21. The method of claim 17, wherein the non-scheduled transmission information is set for at least one of data of a signaling radio bearer (SRB) for transmitting high layer signaling information, data of a guaranteed bit rate (GBR) service for ensuring a predefined data rate, and scheduling information.

22. An apparatus for controlling non-scheduled transmission of a user equipment (UE) in a radio network controller (RNC) of a mobile communication system for supporting an enhanced uplink dedicated channel (E-DCH), comprising:

a controller setting k transmission time intervals (TTIs); and a transmitter transmitting, to the UE, non-scheduled transmission information indicating the k TTIs for transmitting non-scheduled data via the E-DCH within a period having N TTIs;

wherein the non-scheduled transmissions can be performed during the k TTIs within the period, and the parameter k is an integer greater than 0 and less than or equal to a positive integer N.

23. The apparatus of claim 22, wherein the controller determines an effective data rate for the non-scheduled transmission by considering at least one of the capacity of UEs for providing an uplink packet data service, the requested quality of service (QoS), the number of UEs, and uplink radio resource available in a cell sets values of the N for performing non-scheduled transmission in the UE and the k according to the effective data rate and an allowed maximum transmission delay time, and determines the TTIs that do not overlap between UEs using the values of the N and the k.

24. The apparatus of claim 22, wherein the non-scheduled transmission information is configured by a bit map of N bits indicating the k TTIs using specific bit values.

25. The apparatus of claim 22, wherein the non-scheduled transmission information is set for the data to be used for non-scheduled transmission according to a service type or a data rate.

26. The apparatus of claim 22, wherein the non-scheduled transmission information is set for at least one of data of a signaling radio bearer (SRB) for transmitting high layer signaling information, data of a guaranteed bit rate (GBR) service for ensuring a predefined data rate, and scheduling information.

27. A method for transmitting uplink data in a mobile communication system for supporting an enhanced uplink dedicated channel (E-DCH), comprising the steps of:

transmitting scheduling information about at least one of a buffer status indicating an amount of data to be transmitted and uplink transmission power to a Node B;

receiving at least one of scheduling assignment information generated by the Node B based on the scheduling information and non-scheduled transmission information indicating k transmission time intervals (TTIs) for transmitting non-scheduled data via the E-DCH within a period having N TTIs;

transmitting uplink data according to the scheduling assignment information in a Node B controlled scheduling mode; and transmitting uplink data on at least one TTI of the k TTIs within the period in a non-scheduled transmission mode;

wherein the parameter k are integer greater than 0, and less than or equal to a positive integer N.

28. The method of claim 27, wherein the non-scheduled transmission information is configured by a bit map of N bits indicating the k TTIs using specific bit values.

29. The method of claim 27, wherein the non-scheduled transmission information is determined according to an effective data rate and an allowed maximum transmission delay time, the effective data rate being determined by considering at least one of the capacity of user equipments (UEs) for providing an uplink packet data service, the requested quality of service (QoS), the number of UEs, and the uplink radio resource available in a cell.

30. The method of claim 27, further comprising the step of:

selecting the Node B controlled scheduling mode or the non-scheduled transmission mode according to a service type or transmission rate of the data.

31. The method of claim 27, wherein the non-scheduled transmission mode is used for at least one of the data of a signaling radio bearer (SRB) for transmitting high layer signaling information, the data of a guaranteed bit rate (GBR) service for ensuring a predefined data rate, and scheduling information.

32. The method of claim 27, wherein the step of transmitting the uplink data in the non-scheduled transmission mode comprises the steps of:

computing a non-scheduled transmission determination value according to a connection frame number (CFN) for generating a frame to be used in communication with a Node B accessed by the UE and a subframe number; and transmitting the data in TTIs in which non-scheduled transmission determination values correspond to values of the k TTIs.

33. The method of claim 32, wherein the non-scheduled transmission determination value is computed by $(CFN*n+ \text{Subframe Number}) \mod N$, where a TTI size of the E-DCH is $1/n$ of a frame length.

34. An apparatus for transmitting uplink data in user equipment (UE) of a mobile communication system for supporting an enhanced uplink dedicated channel (E-DCH), comprising:
- a receiver receiving at least one of scheduling assignment information generated by the Node B based on a scheduling information and non-scheduled transmission information indicating k transmission time intervals (TTIs) for transmitting non-scheduled data via the E-DCH within a period having N TTIs;
- a controller selecting a Node B controlled scheduling mode or an non-scheduled transmission mode to transmit data; and
- a transmitter transmitting uplink data according to the scheduling assignment information in the Node B controlled scheduling mode, and transmitting uplink data on at least one TTI of the k TTIs within the period in the non-scheduled transmission mode;
- wherein the parameter k is an integer greater than 0, and less than or equal to a positive integer N.

35. The apparatus of claim 34, wherein the non-scheduled transmission information is configured by a bit map of N bits indicating the k TTIs using specific bit values.

36. The apparatus of claim 34, wherein the non-scheduled transmission information is determined according to an effective data rate and an allowed maximum transmission delay time, the effective data rate being determined by considering at least one of the capacity of UEs for providing an uplink packet data service, the requested quality of service (QoS), the number of UEs, and the uplink radio resource available in a cell.

37. The apparatus of claim 34, wherein the controller selects the Node B controlled scheduling mode or the non-scheduled transmission mode according to a service type or transmission rate of the data.

38. The apparatus of claim 34, wherein the non-scheduled transmission mode is used for at least one of data of a signaling radio bearer (SRB) for transmitting high layer signaling information, data of a guaranteed bit rate (GBR) service for ensuring a predefined data rate, and scheduling information.

39. The apparatus of claim 34, wherein the transmitter computes a non-scheduled transmission determination value according to a connection frame number (CFN) for generating a frame to be used in communication with a Node B accessed by the UE and a subframe number, and transmits the data in TTIs in which non-scheduled transmission determination values correspond to values of the k TTIs.

40. The apparatus of claim 39, wherein the non-scheduled transmission determination value is computed by (CFN*n+Subframe Number)mod N, where a TTI size of the E-DCH is 1/n of a frame length.

* * * * *